United States Patent [19]
Chase

[11] Patent Number: 5,675,902
[45] Date of Patent: Oct. 14, 1997

[54] PROBE HEAD

[75] Inventor: James L. Chase, Wotton-Under-Edge, United Kingdom

[73] Assignee: Renishaw PLC, Gloucestershire, United Kingdom

[21] Appl. No.: 496,414

[22] Filed: Jun. 29, 1995

[30] Foreign Application Priority Data

Jun. 30, 1994 [GB] United Kingdom ............. 9413194

[51] Int. Cl.$^6$ ........................................... G01B 5/004
[52] U.S. Cl. .................. 33/559; 33/556; 33/702; 33/503
[58] Field of Search ............... 33/503, 556, 558, 33/559, 561, 702

[56] References Cited

U.S. PATENT DOCUMENTS

| | | |
|---|---|---|
| 4,888,877 | 12/1989 | Enderle et al. . |
| 4,982,508 | 1/1991 | Nelle et al. . |
| 5,014,440 | 5/1991 | Lessi et al. ............... 33/558 |
| 5,014,444 | 5/1991 | Breyer . |
| 5,018,278 | 5/1991 | Aehnelt et al. ............ 33/559 |
| 5,065,526 | 11/1991 | Breyer . |
| 5,125,163 | 6/1992 | Bury ........................... 33/503 |
| 5,174,039 | 12/1992 | Murai ......................... 33/556 |
| 5,179,786 | 1/1993 | Shelton . |
| 5,187,874 | 2/1993 | Takahashi et al. ........ 33/503 |
| 5,258,698 | 11/1993 | Piovano et al. ........... 318/569 |

FOREIGN PATENT DOCUMENTS

| | | |
|---|---|---|
| A-0 317 967 | 5/1989 | European Pat. Off. . |
| A-0 368 040 | 5/1990 | European Pat. Off. . |
| A-0 470 425 | 2/1992 | European Pat. Off. . |
| A 34 12 538 | 10/1985 | Germany . |
| C 38 21 860 | 10/1989 | Germany . |

*Primary Examiner*—Christopher W. Fulton
*Attorney, Agent, or Firm*—Oliff & Berridge

[57] ABSTRACT

A probe head for a coordinate measuring machine is provided with a heat control management system which regulates the amount of heat generated within the probe head in order to provide thermal stability thereof. The heat control system includes a processor which determines the amount of current passed to one or more motors within the probe head over a predetermined time interval. The processor then determines whether auxiliary heat sources should be activated in order to provide thermal stability. In one embodiment the auxiliary heat sources are provided by passing a high frequency current through the motors of the probe head.

16 Claims, 2 Drawing Sheets

PROBE HEAD

The present invention relates to an articulating probe head used, for example, to support, with two degrees of rotational freedom, an inspection probe upon the movable arm of a coordinate positioning machine such as a machine tool or coordinate measuring machine. Such probe heads perform the function of orienting the probe relative to the movable arm, to enable the probe to inspect differently oriented surfaces of, for example, a machine part such as an engine casing, which would otherwise be inaccessible to the probe.

One known form of an articulating probe head includes a base upon which first and second rotors are serially mounted for rotation about substantially perpendicular first and second axes respectively. The first and second rotors are each rotatable between a plurality of kinematic rest positions, provided at discrete angular orientations about the first and second axes on base and first rotor respectively. Engagement and disengagement into and out of a said kinematic rest position is performed by a series of levers and cams, which axially move the first and second rotors relative to the support and first rotor respectively; rotation about the first and second axes of the first and second rotors is performed by electric motors provide on the base and first rotor respectively. The probe head is therefore able to orient the probe in any one of a large number of angularly indexed and highly repeatable positions relative to its base (and therefore the movable arm of the machine). The actual location of the probe relative to the movable arm of the machine in a given indexed position therefore may, to within an acceptable level of accurancy, be presumed to be the same each time the probe head is actuated to attain the said orientation. This avoids having to recalibrate the probe each time its orientation is changed, which is a feature of great practical importance since it permits flexible yet time-efficient part inspection.

A problem with motorised probe heads generally, is that the heat generated by the motors during actuation thereof causes a corresponding-thermal growth in the head structure, thereby giving rise to a small error in the position of the probe relative to its assumed position (for example, in an indexing probe head, the pre-calibrated position corresponding to an indexed orientation). Hitherto, such effects have been sufficiently small to be insignificant within the context of the measuring accuracy. However, demands for accuracy are increasing, and, in certain circumstances, such thermal distortions are now contributing significantly to the error budget of a given machine.

In accordance with the present invention, a probe head is provided in which a heat source is actuated during time intervals when the motors of the probe head are not in operation. Preferably, the heat source is controlled to provide a close imitation of the heat output of the motors during operation. In one embodiment, the motors themselves provide the heat source by the passage of a high frequency alternating current therethrough. In an alterative embodiment a separate heat source is supplied; preferably this heat source is wrapped around the motor to create as similar an effect as possible.

Embodiments of the invention will now be described, by way of example, and with reference to the accompanying drawings in which.

Figure 1:
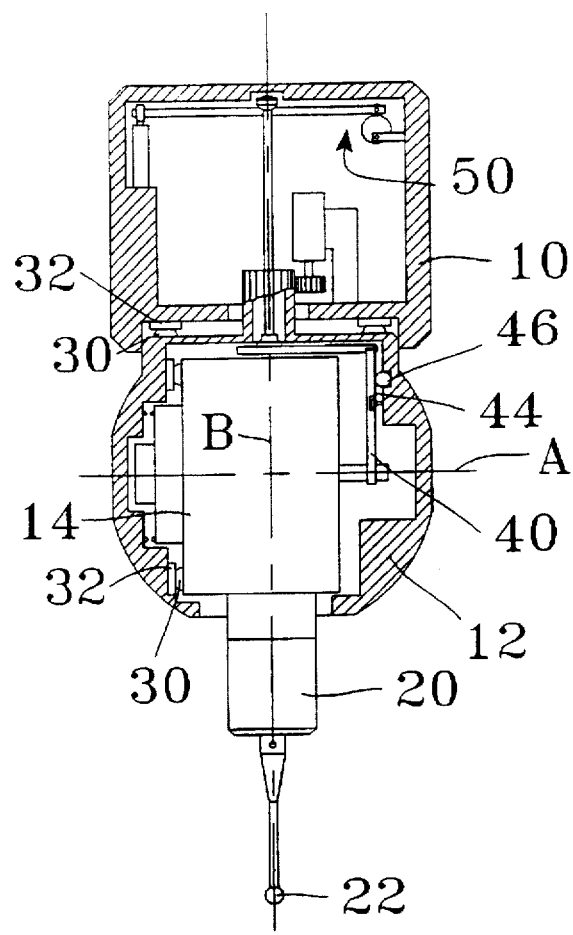
FIG. 1 is a section through a two-axis indexing probe head.

Referring now to FIG. 1, an articulating probe head orients a touch probe 20 between a plurality of angularly indexed positions, provided at discrete angular displacements about substantially perpendicular axes A,B, and includes a substantially rectangular base 10, by which the probe head may be supported on the movable arm of a coordinate positioning machine. The probe 20 is supported by the probe head via a first rotor 12, supported for rotation relative to the base 10 about axis B, and a second rotor 14, to which the probe 20 is directly connected, supported on the first rotor 12 for rotation about axis A. At each indexed position of the probe 20 relative to the base 10, the first rotor 12 is kinematically supported with respect to the base 10, and the second rotor 14 is kinematically supported with respect to the first rotor 12. As a result, the location, in any given indexed position, of the spherical stylus tip 22 supported by the probe 20 relative to the base 10 is highly reproducible each time the said indexed position is adopted. The kinematic indexed positions enabling this are provided by rings of balls 30 on the first and second rotors 12,14, which are engaged at three substantially equispaced locations by three rollers 32, provided on the base 10 and first rotor 12. Axial disengagement out of the given indexed position, to enable rotation of the first and/or second rotors 12,14 to another angular orientation, is provided by a substantially "S"-shaped tie-rod 40, which is hinged on the first rotor 12 by a planar spring 44 and a cylindrical bearing 46, and elevated or lowered by means of a lever and cam system 50 on the base 10. Actuation of the lever and cam mechanism 50, and rotation of the first and second rotors 12,14 between indexed locations is controlled by three respective electric motors (not shown in FIG. 1). Such an indexing mechanism is well known per se, and is available commercially as the Renishaw PH9 probe head, for example.

Actuation of the motors which operate the lever and cam system 50, and rotate the first and/or second rotors 12,14 results in the generation of heat within the probe head. This heat inevitably causes an expansion of the structure of the probe head, which in turn has a corresponding displacing effect upon the location of the spherical stylus tip 22 relative to the base 10.

In order to ameliorate the problem of variation in position of the stylus tip 22 due to expansion and/or contraction of the probe head, a heat management control system is provided to reduce the variation in the amounts of heat generated within the head during operation thereof. In its simplest form, the heat control system merely includes a controllable heat source in the form of a heating element (for example a suitable resistor) which continuously generates an amount of heat which is significant in comparison with the heat output of the three motors in the probe head. Thus, the difference in heat output between instances of time during which one or more of the motors within the probe head are operating, and those instances of time during which they are not is significantly reduced, yielding a corresponding reduction in the magnitude of thermal expansion and/or contraction of the probe head during operation. In a modification of this embodiment, a communication link is provided between the heat control circuitry, and the circuitry which operates the motors within the probe head, such that the heating element is turned off during operation of the motors. Preferably in this embodiment, the heat output of the element is roughly equal to the average output of a motor within the probe head. In a further modification, a heating element is provided in respect of each motor, and all three heating elements are operated in this fashion.

Figure 2:
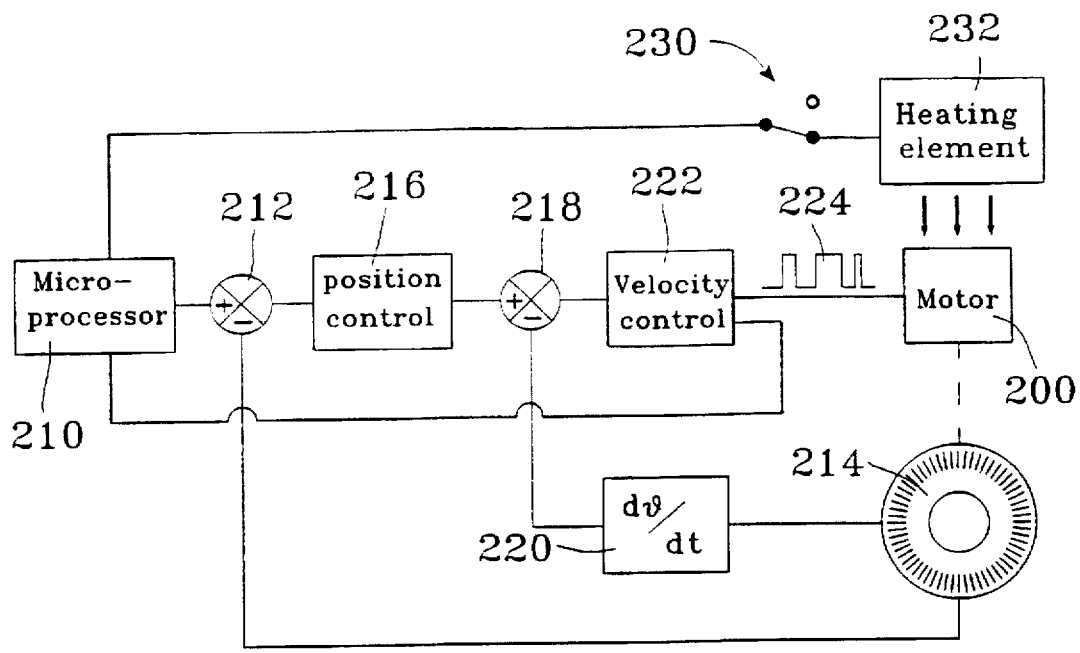
FIG. 2 is a schematic illustration of a first embodiment of the present invention.

Referring now to FIG. 2, a more sophisticated heat management control system will now be described, in which interaction between the heat control system and the servo circuitry which drives the motors in the probe head provides a constant heat output as measured over a sample time period. The probe head servo circuitry which will now be described relates to a motor for rotating either the first rotor 12 or second rotor 14; the lock-unlock motor which operates the lever and cam mechanism 50 may be provided with similar servo and heat control systems (the rotating motors have been chosen for exemplification because their normal operation is more complex). The servo system for rotational motor 200 includes a microprocessor 210, which receives signals from a computer controlling the coordinate positioning machine (on which the probe head is used) relating to a given target indexed position of, e.g. the first rotor 12 about the B axis. From this signal, the microprocessor 210 generates a position demand signal in terms of a given angular displacement of the first rotor 12 about axis B relative to a datum. The position demand signal is sent to a summing junction 212, which also receives a signal from an encoder 214 representing the actual angular displacement about axis B of the first rotor 12. The output of the summing junction 212 is thus a position servo error signal which could be used directly to actuate the motor 200. However, it is also a requirement that the angular velocity of the first rotor relative to the base be controlled to effect a smooth transition between indexed positions. To this end, a position control circuit 216 is provided which generates a velocity demand signal in dependence upon the magnitude of the position servo error signal; e.g. the greater the position servo error signal, the greater the velocity demand signal. The velocity demand signal is sent to a further summing junction 218 which also receives an input from a differentiating circuit 220 which, from the output of encoder 214, determines the instantaneous angular velocity of the first rotor 12. From the magnitude of the velocity servo error signal output from summing junction 218, a velocity control circuit 222 generates a driving signal for the motor 200. This driving signal has the form of a train of pulses having equal height, but varying width. The output of the velocity control circuit 222 is also sent to the microprocessor 210, which continuously monitors the pulse width over a given sampling interval. This monitored pulse width is compared with a predetermined value of pulse width stored within the microprocessor 210, which corresponds to a nominal driving current passed through the motor 200 in a given time period. Typically the predetermined pulse width is chosen in accordance with the heaviest frequency of usage envisaged for the motor 200. If the probe head is operated at this maximum envisaged frequency of usage, the heat management system will not operate, because the rate of heat output generated by the motors is sufficiently constant for the probe head to remain relatively stable in size. If however, the probe head is not operated sufficiently frequently to generate such an output of heat (as determined by the microprocessor 210 in accordance with a comparison of the two pulse widths), the microprocessor switches in, via a switch 230, a heating element 232. The heating element 232 has the form of a resistor of approximately equal resistance to the motor 200. In a preferred embodiment, the heater 232 is wrapped around the motor in order to mimic as closely as possible the generation of heat by the motor. Actuation of heating element 232 by microprocessor 210 is by the generation of a further series of pulses of equal height and varying width, and continues until the microprocessor 210 has determined, from a comparison of the pulses received from velocity control circuit 222, the predetermined pulse width stored within the microprocessor 210 and the pulses generated to actuate heating element 232, that the heat generated by the motor 200 conforms to the predetermined rate of heat output. If, during actuation of the heating element 232, the machine control requires the probe head to re-orient the probe 20, the microprocessor 210 ceases to activate the heating element 232 for at least the duration of the orienting move.

Figure 4:
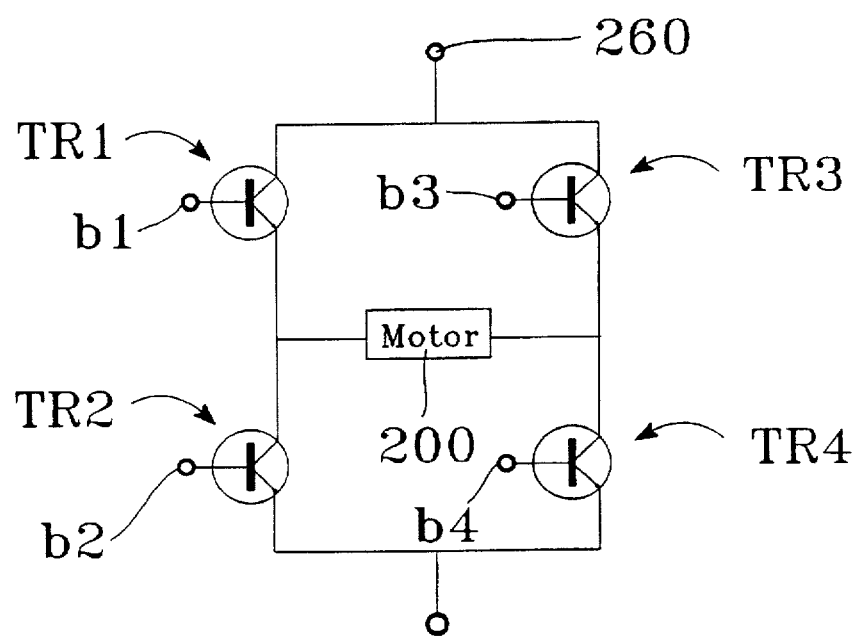
FIG. 4 is a detail of FIG. 2.
Figure 3:
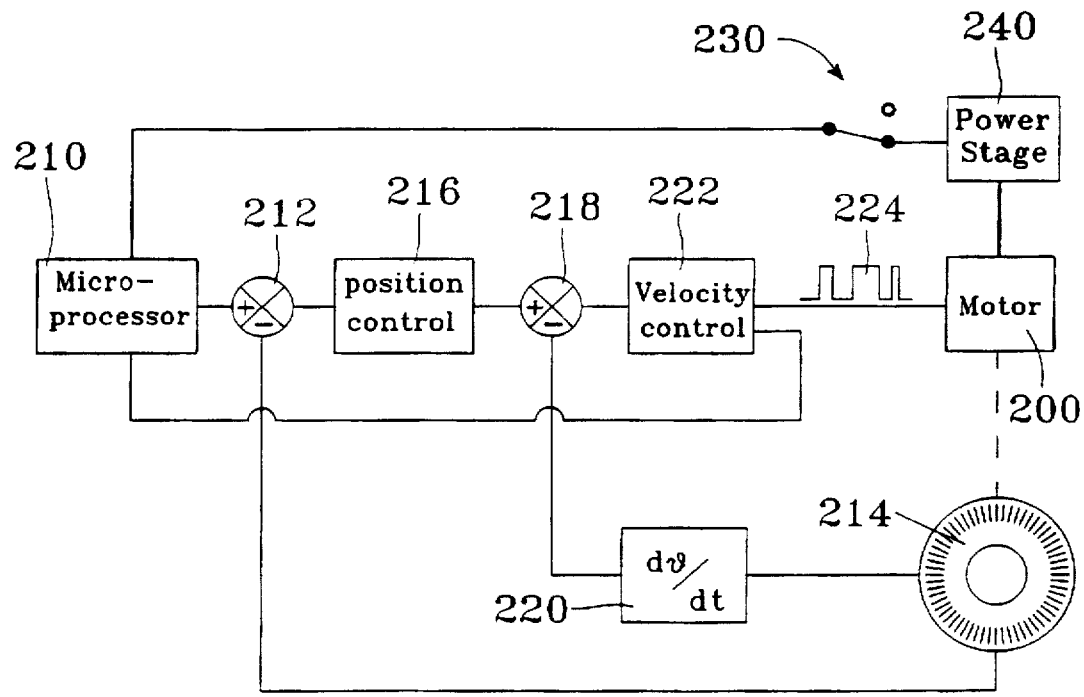
FIG. 3 is a schematic illustration of a second embodiment of the present invention.

A modification of this embodiment will now be described, with reference to FIGS. 3 and 4, wherein like elements of the system will be described with reference to identical reference numbers. As described in relation to the system of FIG. 2, a microprocessor 210 controls the operation of a motor 200 via nested position and velocity servo loops, which receive information from an encoder 214 and a differentiating circuit 220. The principle of activation of the motor 200 and the heat control system is as described above, with an important difference, in that the heating element is provided by passing a high frequency alternating current through the motor 200. This is achieved by providing a power stage 240, via which the microprocessor 210 passes current through the motor 200. Referring now to FIG. 4, the power stage comprises an H-bridge including four transistors TR1–TR4. Current is input to the H-bridge at input 260 and, depending upon the direction of the current through the motor, the microprocessor 210 switches on either transistors TR1 and TR4, or TR2 and TR3 (by supplying a predetermined current to their base terminals b1–b4). The switching frequency is relatively high, such that no physical motion of the motor 200 will ever occur as a result of such a passage of current therethrough; the current will however still cause the requisite heating effect. This embodiment thus has the advantage of generating the auxiliary amount of heat required to stabilise the structure of the probe head from the motors of the probe head which themselves generate heat during normal operation. It is therefore possible to mimic more closely the normal operation of the probe head, as well as having the advantage of avoiding additional components.

The present invention has been exemplified with reference to an indexing probe head. It is equally applicable to other types of probe head, such as the probe head described in EP 317967.

I claim:

1. A coordinate positioning apparatus having an articulating probe head for orienting a probe relative to a movable arm of the apparatus with at least one rotational degree of freedom, the probe head including: a base, by means of which the probe head may be mounted to the movable arm, at least one rotor, to which the probe is connectable, supported on the base in a manner permitting relative rotation of the rotor and base, a motor for rotating the rotor relative to the base, and at least one controllable heat source, actuable to generate heat within the probe head when the motor is not operating to rotate the rotor, the coordinate positioning apparatus further including a control having:

operating means for intermittently operating the motor to rotate the rotor to orient the probe;

monitoring means for continuously monitoring heat dissipated by said motor over intervals of sampling time and determining an instantaneous rate of heat dissipation;

comparing means for comparing the instantaneous rate of heat dissipation with a nominal rate of heat dissipation; and actuating means for actuating the at least one controllable heat source to generate heat when the motor is not being operated to rotate the rotor, and the instantaneous rate of heat dissipation is lower than the nominal rate of heat dissipation.

2. A coordinate positioning apparatus according to claim 1, wherein the heat source is distinct from the motor.

3. A coordinate positioning apparatus according to claim 2, wherein the distinct heat source is fixed to the motor.

4. A coordinate positioning apparatus according to claim 1, wherein the heat source is provided by the motor, and the control further comprises means for passing a high frequency current through the motor.

5. A coordinate positioning apparatus according to claim 1, wherein the actuating means comprises a detector for detecting when the motor is not operating, and means for passing current through the controllable heat source.

6. A coordinate positioning apparatus according to claim 5, wherein the actuating means is adapted to prevent the current from passing through the controllable heat source when the motor is operating.

7. A coordinate positioning apparatus according to claim 6, wherein the actuating means further comprises means for monitoring the current passed through the motor over a given interval of sampling time.

8. A coordinate positioning apparatus according to claim 7, wherein the actuating means further comprises means for comparing a value of the current passed through the motor in the interval of sampling time with a predetermined value, and for generating a signal corresponding to the difference, if any, between the two values.

9. A coordinate positioning apparatus according to claim 8, wherein the actuating means is adapted to activate the controllable heat source to generate an amount of heat corresponding to a value of the difference signal.

10. A method of operating an articulating probe head for a coordinate positioning apparatus, the probe head having: a base for mounting the probe head to a movable arm of the apparatus, at least one rotor to which a probe is connectable, the rotor being supported on the base in a manner permitting relative rotation of the rotor and the base, a motor for rotating the rotor relative to the base, and a controllable heat source actuable to generate heat, the method comprising the steps of:

intermittently operating the motor to rotate the rotor to orient the probe;

continuously monitoring heat dissipated by the motor over intervals of sampling time, and determining an instantaneous rate of heat dissipation;

comparing the instantaneous rate of heat dissipation with a nominal rate of heat dissipation; and actuating the controllable heat source to generate heat when the motor is not being operated to rotate the rotor, and the instantaneous rate of heat dissipation is lower than the nominal rate of heat dissipation.

11. A method according to claim 10, wherein the controllable source is actuable to generate heat only when the motor is not operating to rotate the rotor.

12. A method according to claim 11, wherein the controllable heat source is provided by the motor, the method further comprising passing current through the motor to cause a rapid low amplitude oscillation of the motor without rotation of the rotor.

13. A method according to claim 12, wherein the motor is a DC motor, and wherein a high frequency AC current is passed through the motor to provide the controllable heat source.

14. A method according to claim 10, wherein the instantaneous rate of heat dissipation is determined by monitoring a current through the motor.

15. A method according to claim 10, wherein the controllable heat source is provided by a heating element within the probe head which is distinct from the motor.

16. A method according to claim 15, wherein the heat source is actuable to generate heat only when the motor is not operating to rotate the rotor.

* * * * *